(12) United States Patent
Wicks et al.

(10) Patent No.: US 12,607,030 B1
(45) Date of Patent: Apr. 21, 2026

(54) SYSTEM FOR SECURING AN OPEN-ENDED FILTER TO A SUBMERSIBLE CLEANER

(71) Applicants: Frederic Wicks, Winter Park, FL (US); Aaron Wicks, Winter Park, FL (US)

(72) Inventors: Frederic Wicks, Winter Park, FL (US); Aaron Wicks, Winter Park, FL (US)

( * ) Notice: Subject to any disclaimer, the term of this patent is extended or adjusted under 35 U.S.C. 154(b) by 0 days.

(21) Appl. No.: 19/056,933

(22) Filed: Feb. 19, 2025

(51) Int. Cl.
   *E04H 4/16* (2006.01)
   *B01D 29/25* (2006.01)
   *B01D 29/96* (2006.01)
(52) U.S. Cl.
   CPC ........... *E04H 4/1636* (2013.01); *B01D 29/25* (2013.01); *B01D 29/96* (2013.01)

(58) Field of Classification Search
   CPC ....... E04H 4/16; E04H 4/1636; E04H 4/1654; B01D 29/25
   See application file for complete search history.

(56) References Cited

U.S. PATENT DOCUMENTS

| | | | |
|---|---|---|---|
| 10,711,475 B1 | 7/2020 | Heffernan | |
| 11,149,458 B1 * | 10/2021 | Mjelde | E04H 4/1636 |
| 2020/0353390 A1 * | 11/2020 | Roumagnac | B01D 39/08 |
| 2024/0050875 A1 * | 2/2024 | Thiessen | B01D 29/21 |

* cited by examiner

*Primary Examiner* — Michael D Jennings
(74) *Attorney, Agent, or Firm* — Terry M. Sanks, Esq.; Beusse Sanks, PLLC

(57) ABSTRACT

A system to secure an open-ended filter to a submersible cleaner including a yoke attached to the submersible cleaner that fits within a first opening of the open-ended filter, a cap for covering a distal end of the open-ended filter, and a rod extending within the open-ended filter from the yoke to the cap to connect the yoke to the cap.

20 Claims, 9 Drawing Sheets

100

102

10

110

138

18

16

710     550

10

505

16

510

SYSTEM FOR SECURING AN OPEN-ENDED FILTER TO A SUBMERSIBLE CLEANER

BACKGROUND

Embodiments relate to a mobile swimming pool cleaner and, more particularly, to a system to secure an open-ended filter with the cleaner with minimum attachments and minimum adjustments.

Unless enclosed, a recurring maintenance process that must be performed on a swimming pool is periodically clearing debris that has accumulated in the swimming pool. The debris generally floats on the surface of the body of water or settles on the base, or floor, of the body of water.

Mobile suction-based pool cleaners exist to clean the debris from the pool. A typical suction-based pool cleaner utilizes a bag as the actual filter. The neck of the bag closes over and is held to an annular conduit terminus, such as a pipe stub which is part of the pool cleaner. However, filter bags are considered to provide an insufficient filtration area for some situations for any given length and girth of the filter. Also, particle mesh size ratings of bag filters for swimming pools may be insufficiently small to trap some particles.

Manufacturers and users of suction-based pool cleaners discovered that pleated cylindrical filters are superior with respect to filtration area and particle mesh size ratings but were not attachable to the pipe stub as is a bag type filter. However, the bag filter could be manufactured with a closed end whereas the open end could fit over a pipe stub of the pool cleaner, pleated cylindrical filters had two opened ends and securely fitting it over the pipe stub was not readily apparent.

The inventors found a prior art reference that teaches how to utilize the pleated cylindrical filter with the mobile suction-based pool cleaner, namely, U.S. Pat. No. 10,711,475, titled Swimming Pool Cleaner with Pleated Medium Filter (hereinafter the "'475 Patent"). The filter 10 described in the '475 Patent is an open-ended filter, meaning both ends are open. The '475 Patent requires a filter holder 100 that has a spanning connector 106. The spanning connector 106 is configured to span and connect a cap 102 that covers a distal end of the open-ended filter 10, and an adapter 138 configured to cooperate with and engage a pipe stub 18 of the swimming pool cleaner 16. The spanning connector 106 is located outside the open-ended filter 10, wherein the spanning connector 106 comprises a plurality of brackets 104, 110 abutting the pipe stub 18 when the filter holder is installed on the pip stub 18, and a spanning member engaging each one of the brackets when the filter holder is installed on the pipe stub.

FIG. 1 is a prior art representation of a partially exploded view of the system taught by the '475 Patent. As shown, the system attaches to a mobile suction-based pool cleaner. Though not visible, the pool cleaner has a propeller driven system within the pool cleaner 16 to suck debris through the pool cleaner 16 that may be resting on the bottom or base of the body of water such as, but not limited to, the swimming pool floor. As further shown in FIG. 1 are the filter 10 and the filter holder 100. The spanning connectors 106 span between the cap 102 and the adapter 138 on the outside of the filter. As further shown, the spanning connector 106 includes a plurality of brackets to which the spanning connector is engaged. The adapter has a single or unitary diameter.

The pool cleaner may be any robotic or hand maneuvered swimming pool cleaner. The cleaner may be supplied with a water pressurization system. The water pressurization system may comprise a pneumatic or hydraulic motor rotatably driving a water impeller, for example. To this end, the pneumatic motor may be provided with a hose conducting compressed air from an external source. Alternatively, the water pressurization system may be electrically operated, using an onboard battery (not shown), for example.

The inventors have found that the plurality of components in the '475 Patent can result in more than a single point of failure when attaching the filter to the pool cleaner using the prior art. The '475 Patent also provides for several locations where adjustments must be made to ensure the filter is secured properly, especially since there are several attachments needed to secure the filter to the pool cleaner. Thus, attaching the filter utilizing the prior art may be time consuming. Therefore, there exists a need for a filter holder adapted to secure a cylindrical open-ended filter effectively to a pool cleaner where attaching and releasing the filter is possible with minimum steps and components.

SUMMARY

Embodiments relate to a system attaching a cylindrical filter to a pool cleaner that is capable of providing a single attachment within the cylindrical filter.

In an embodiment, the system comprises a yoke attached to the submersible cleaner that fits within a first opening of the open-ended filter, a cap for covering a distal end of the open-ended filter, and a rod extending within the open-ended filter from the yoke to the cap to connect the yoke to the cap.

In another embodiment, the system comprises a submersible cleaner with four contacts to the bottom surface of the body of water, wherein a front contact and a back contact comprise a lesser diameter than a right contact and left contact and having a pivotable attachment to attach a handle, a yoke attached to the submersible cleaner that fits within a first opening of the open ended filter, a cap for covering a distal end of the open-ended filter, and a rod extending within the open-ended filter from the yoke to the cap to connect the yoke to the cap.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore considered to be limiting of its scope, the embodiments will be described and explained with additional specificity and detail through the use of the accompanying drawings in which.

DETAILED DESCRIPTION

Figure 1:
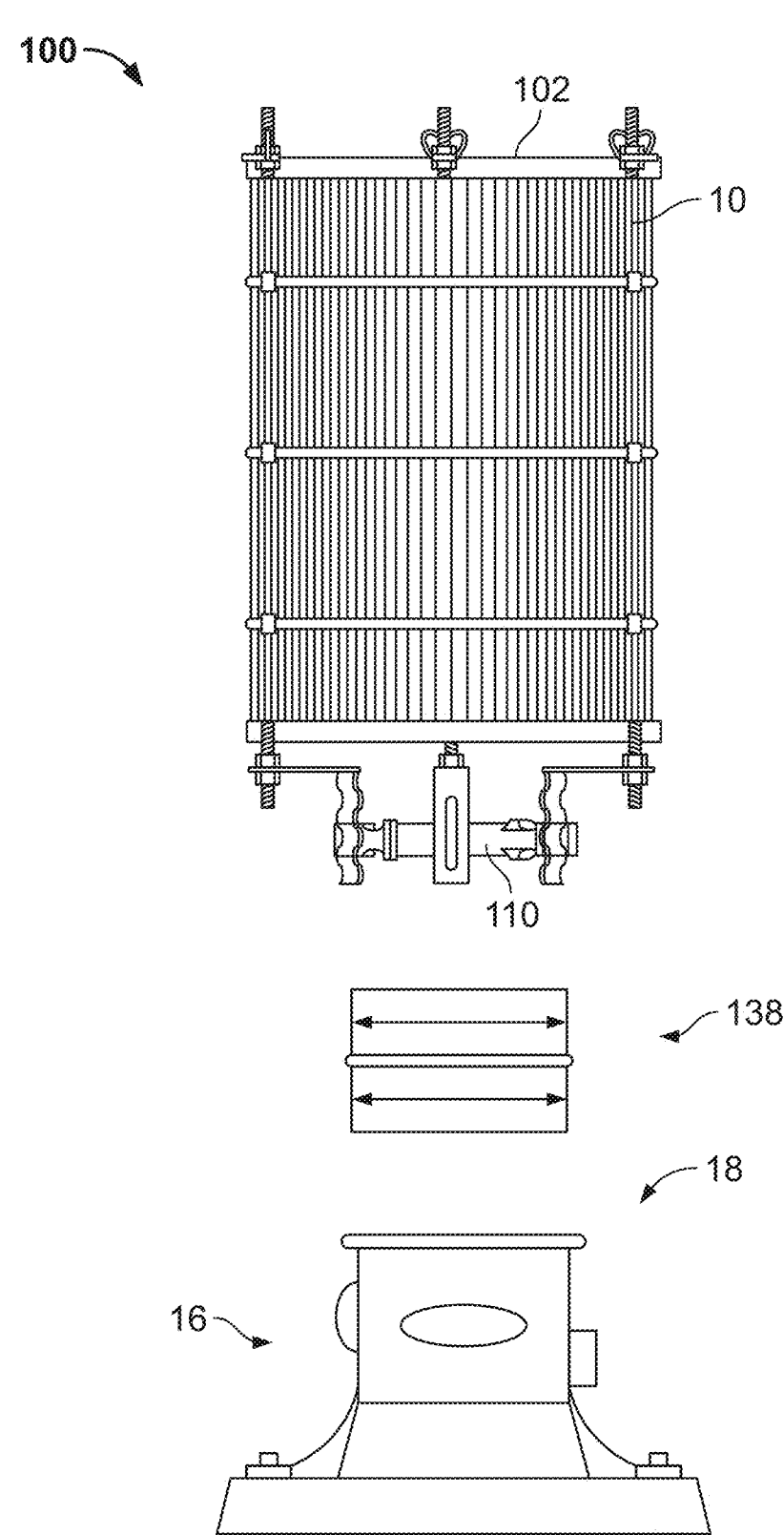
FIG. 1 shows a prior art representation of another system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein provide for a system and method for utilizing a cylindrical or open-ended filter with a mobile suction-based pool cleaner. The cylindrical filter, or filter may be pleated or not. In general, the filter may comprise a medium filter that has a first and second open end. The medium filter may be pleated. The filter may have a shape and is of sufficient rigidity to maintain the shape in the presence of gravity but no other forces. The medium filter typically has a filtration element, and rubber end rings holding the filtration element in a selected configuration, typically cylindrical. The end rings typically have openings at each end of the filter, so that the filter may be installed with either end at the inlet of the fluid being filtered. When pleated, the medium filter typically has an accordion pleated arrangement.

Figure 2:
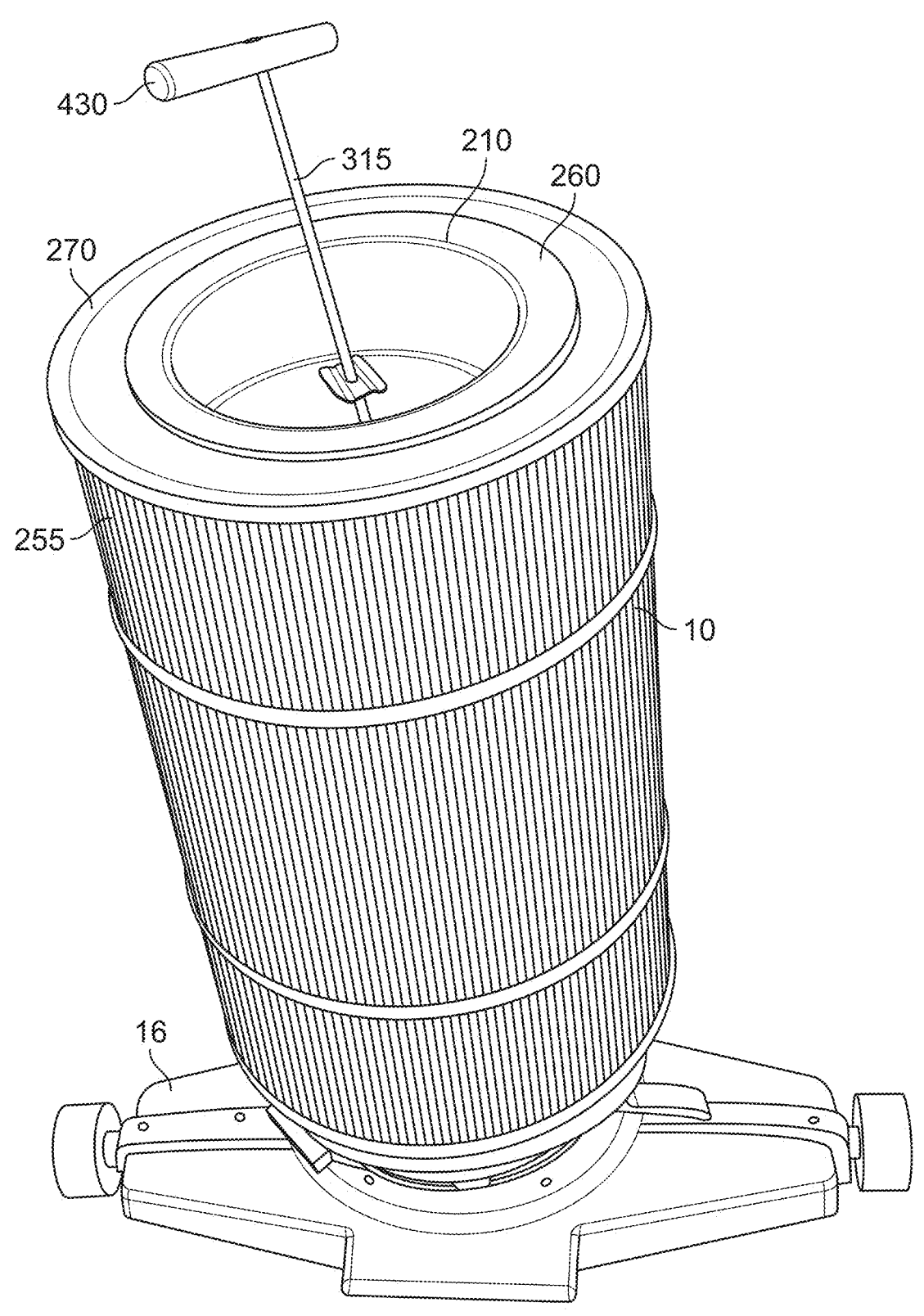
FIG. 2 shows an embodiment of a system.

FIG. 2 shows an embodiment of a system disclosed herein. As shown, the filter 10 is attached to the pool cleaner or submersible cleaner 16. A cap 210 is also visible.

Figure 3:
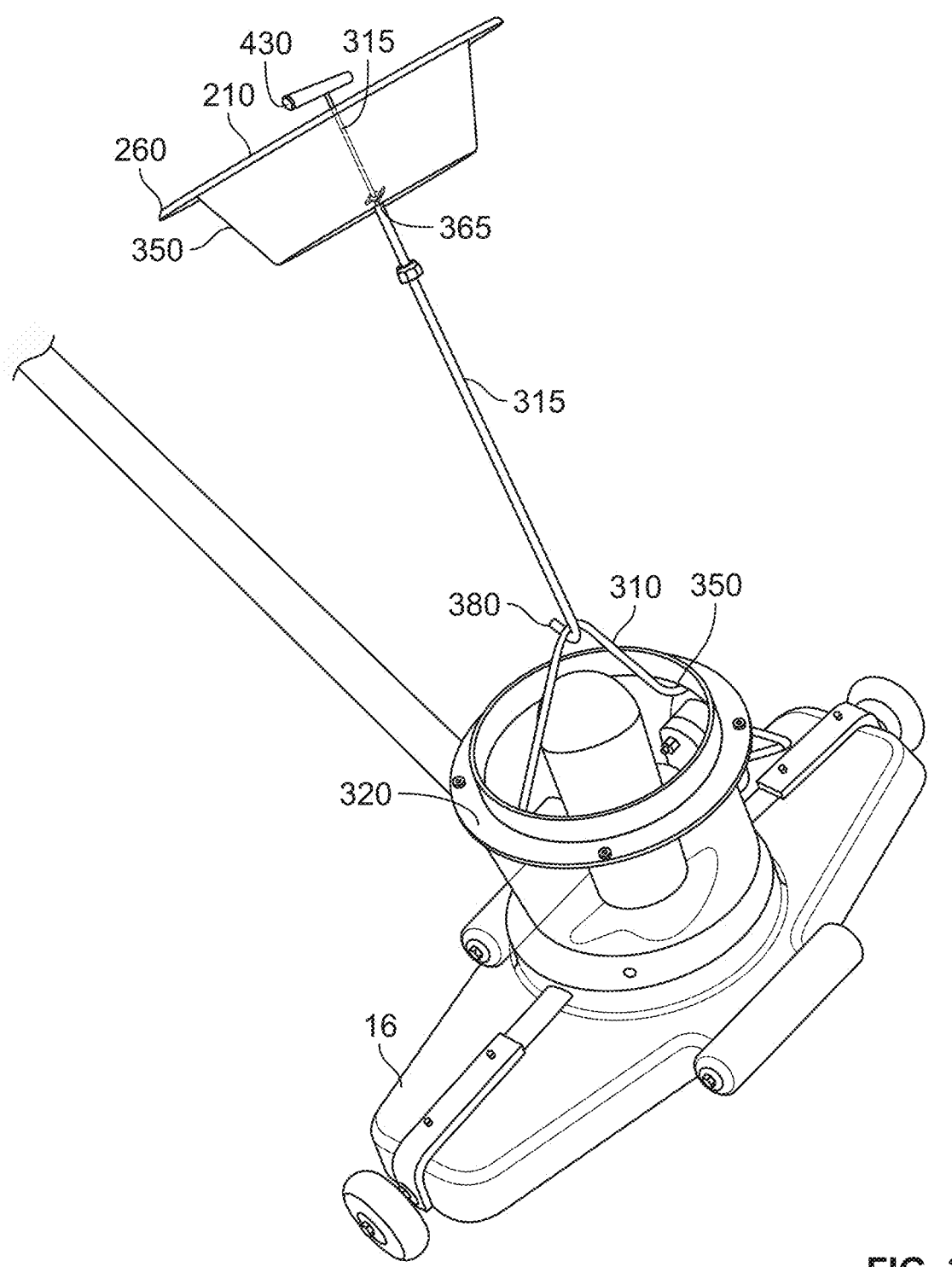
FIG. 3 shows elements of the system without the filter.

FIG. 3 shows elements of the system without the filter. As shown, a yoke 310 is provided. The yoke 310 is attached beneath a rim 320 of the submersible cleaner 16. The yoke 310 may be made of a material that allows the yoke 310 to be spring loaded, extending into respective openings of an upper opening 350 of the submersible cleaner 16 for both ends of the yoke 310. As further shown in FIG. 3, the rim 320 seals with the filter 10. In this embodiment, the rim 320 is the same diameter as the open-ended filter 10.

Typically, mobile suction vacuum cleaners utilize a bag (not shown) instead of where the filter 10 is shown herein. Utilizing the yoke 310 is not limiting as the bag may still be attached instead of the filter 10. Thus, in operation, a user does not need to remove the yoke 310 or yoke 310 and adapter, from the pool cleaner if the user wishes to switch between using the filter 10 or the bag.

As shown further in FIG. 3, the yoke 310 may have a V arrangement, shape or configuration. The yoke 310 is arranged to fit within the center opening of the cylindrical, or open-ended filter 10. Though the yoke 310 is shown having an inverted V arrangement, the shape and name designation of this component is not limiting and other shapes may be utilized. As a non-limiting example, the yoke 310 may have an inverted U arrangement or any other shape that is provided to allow a rod 315 to be attached.

The rod 315 attaches to the yoke 310 and extends to, and through the cap 210. The cap 210 may have a recessed area 350 that extends within a distal end 255 of the open-ended filter 10 and an outer area 260 that abuts a top surface 270 of the open-ended filter 10. With this arrangement, and referring back to FIG. 2, the pool cleaner 16 and filter 10 may be flipped over, or in other words, set upon the top end or surface 270 of the filter 10 so that a user can clean out debris from the bottom of the pool cleaner 16.

As further shown, the cap 210 may have an opening 365 through which the rod 315 extends. The rod 315 may have a hook arrangement 380 at a distal end to engage the yoke 310. The rod 315 may connect to the yoke 310 at an apex of the V arrangement of the yoke 310 to align and secure the open-ended filter 10 and cap 210 to the submersible cleaner 16.

Figure 4:
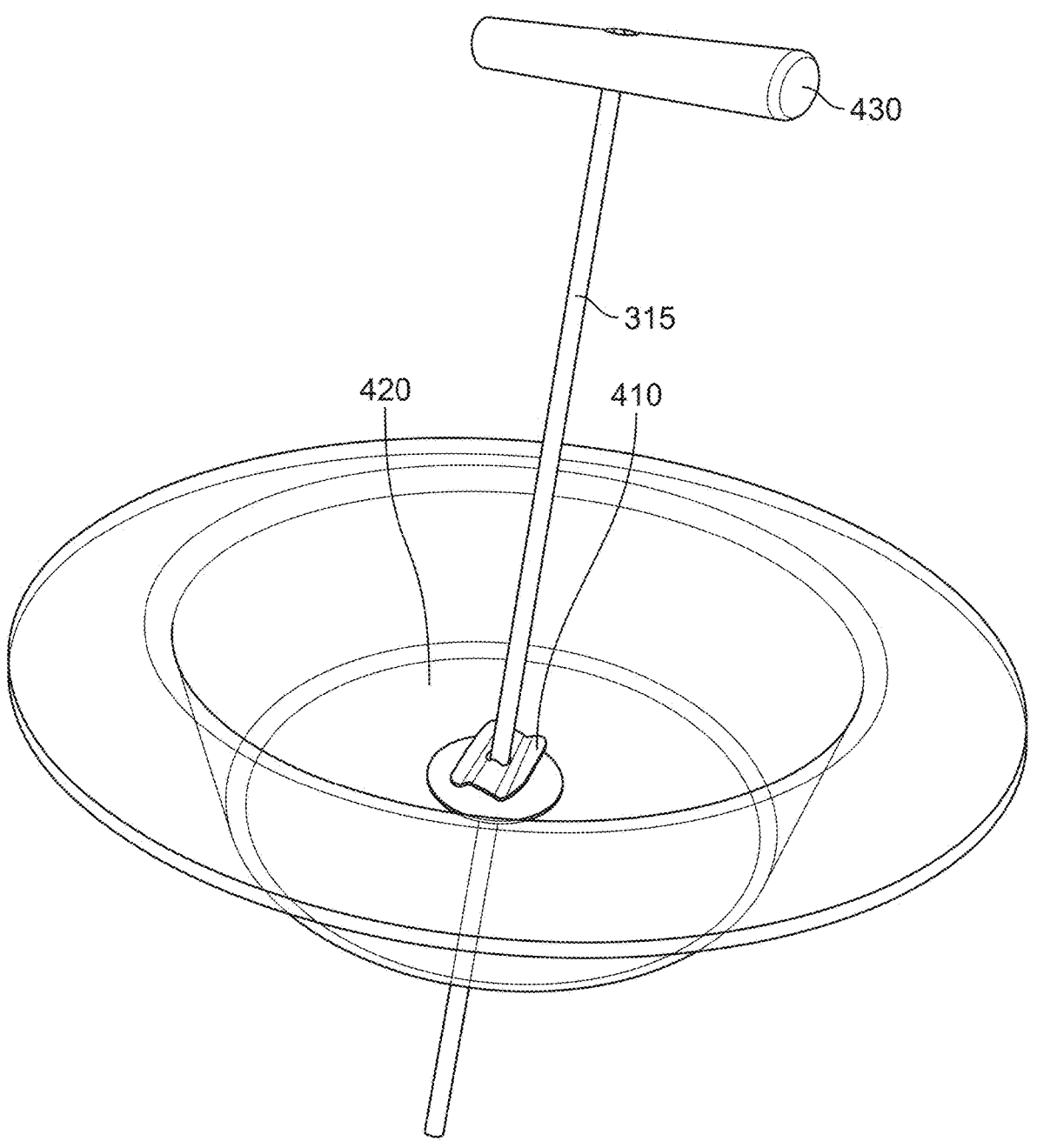
FIG. 4 shows an embodiment of the cap and a distal end of the rod.

FIG. 4 shows and embodiment of the cap and a distal end of the rod. The rod 315 extends through the cap 210. A securing device 410 may be provided. The securing device 410 may be attached to the rod 315 at an outside surface 420 of the cap 210. When the securing device 410 is engaged, the rod 315 is secured to the cap 210 and the yoke 310. Also further shown, a handle 430 may be affixed to the distal end of the rod 315. The securing device is non-limiting. Specifically, other "securing devices" may be utilized. As a non-limiting example, the end of the rod 315 may be threaded and a hex nut, not shown, may be connected via the threaded end.

Figure 5:
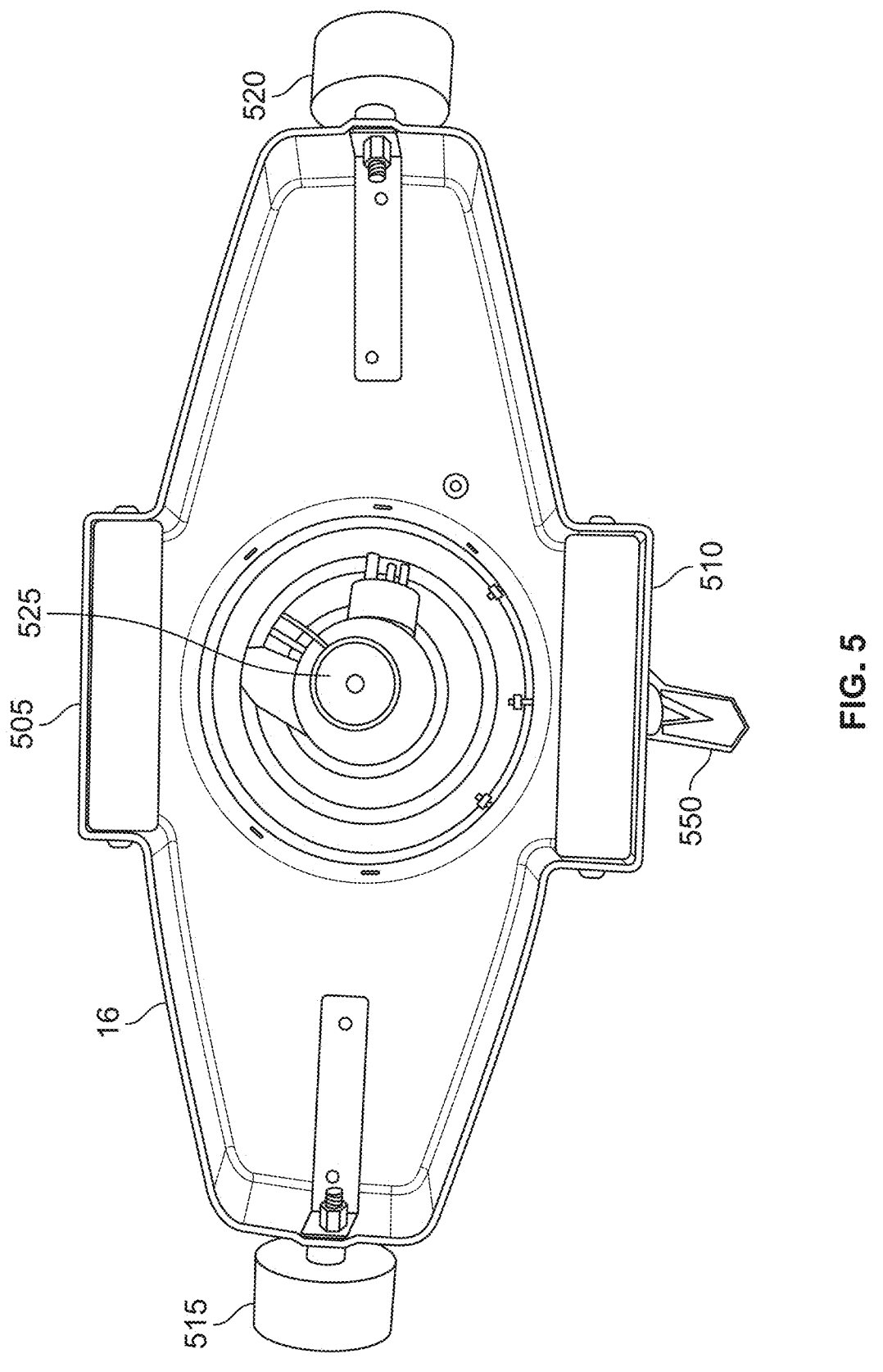
FIG. 5 shows an embodiment of a bottom of a submersible cleaner.

FIG. 5 shows an embodiment of a bottom of a submersible cleaner. The submersible cleaner 16 may further provide contacts points such as, but not limited to, four, that make contact with a base of a body of water. The contact points may include a front roller 505 and a back roller 510 to allow the submersible cleaner 16 to elevate in a front end as the submersible cleaner is pushed forward and a back roller to allow the submersible cleaner 16 to elevate in a back end as the submersible cleaner is pulled backward. As shown, the front roller 505 and the back roller 510 may be elongated rollers. The contact points may further include a left wheel 515 and a right wheel 520 wherein the left wheel 515 and right wheel 520 comprise a larger diameter than the front roller 505 and the back roller 510. Also shown is the propellor system 525, disclosed above, that is located at the bottom of the submersible cleaner. Also visible is a rotatable attachment 550 to connect a handle.

Figure 6:
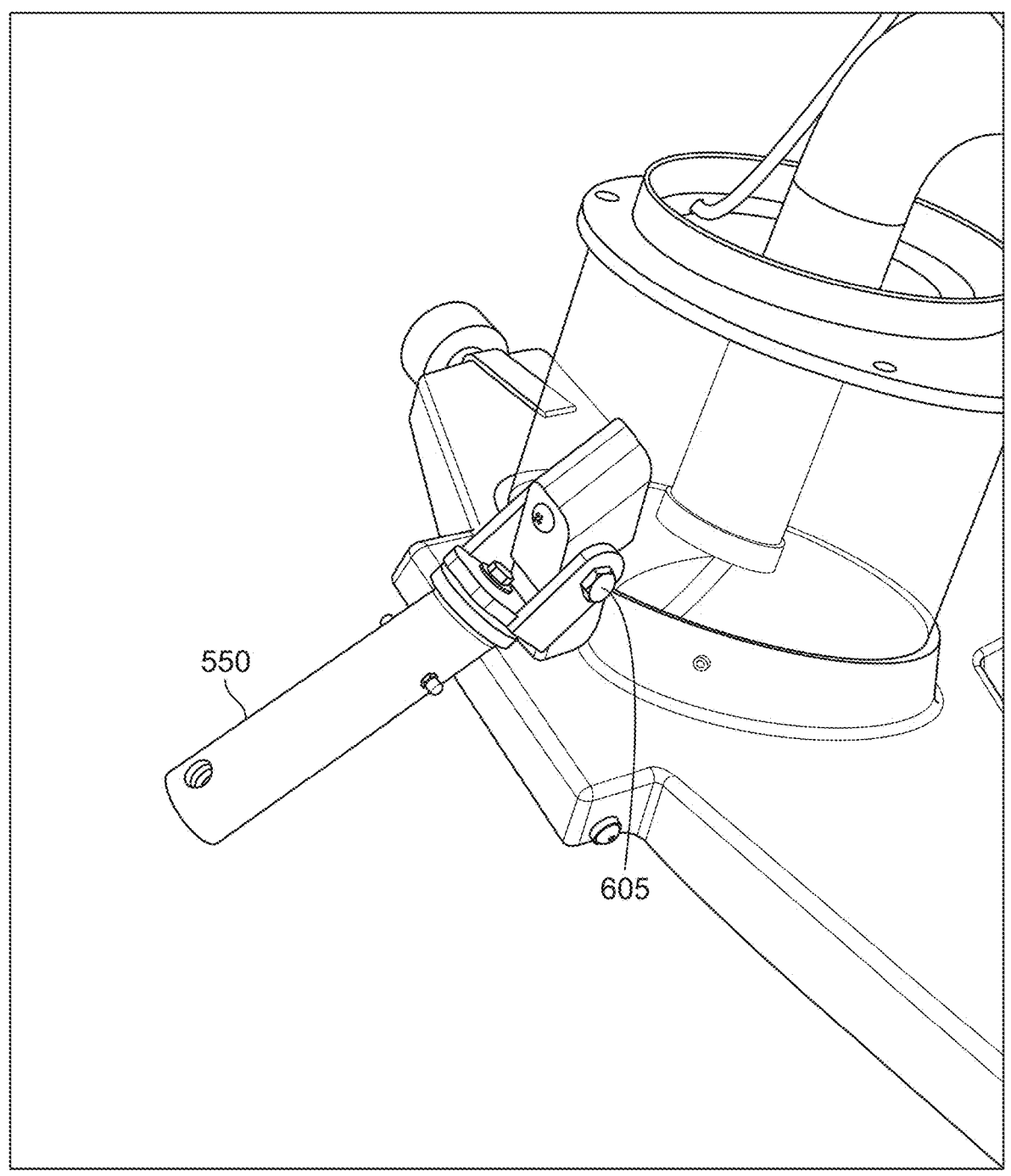
FIG. 6 shows an embodiment of a rear side of the submersible cleaner.

FIG. 6 shows an embodiment of a rear side of the submersible cleaner. The submersible cleaner may comprise the rotatable attachment 550 to receive a handle to allow the handle to pivot about an axis 605 holding the rotatable attachment to the submersible cleaner. For clarity, the front roller 505 may be considered the roller furthest away from the axis 605 and the back roller 510 may be considered the roller closest to the axis 605.

Figure 7:
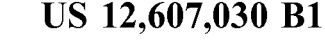
FIG. 7 shows an embodiment of the submersible cleaner when being pushed forward.

FIG. 7 shows an embodiment of the submersible cleaner when being pushed forward. As a user pushes the handle 710, the friction of water against the filter 10 causes the submersible cleaner 16 to tilt backwards, allowing the back roller 510 to make contact with the bottom surface of the body of water whereas the front roller 505 is not making contact, allowing for a larger opening between the bottom of the submersible cleaner and the bottom surface to receive debris.

Figure 8:
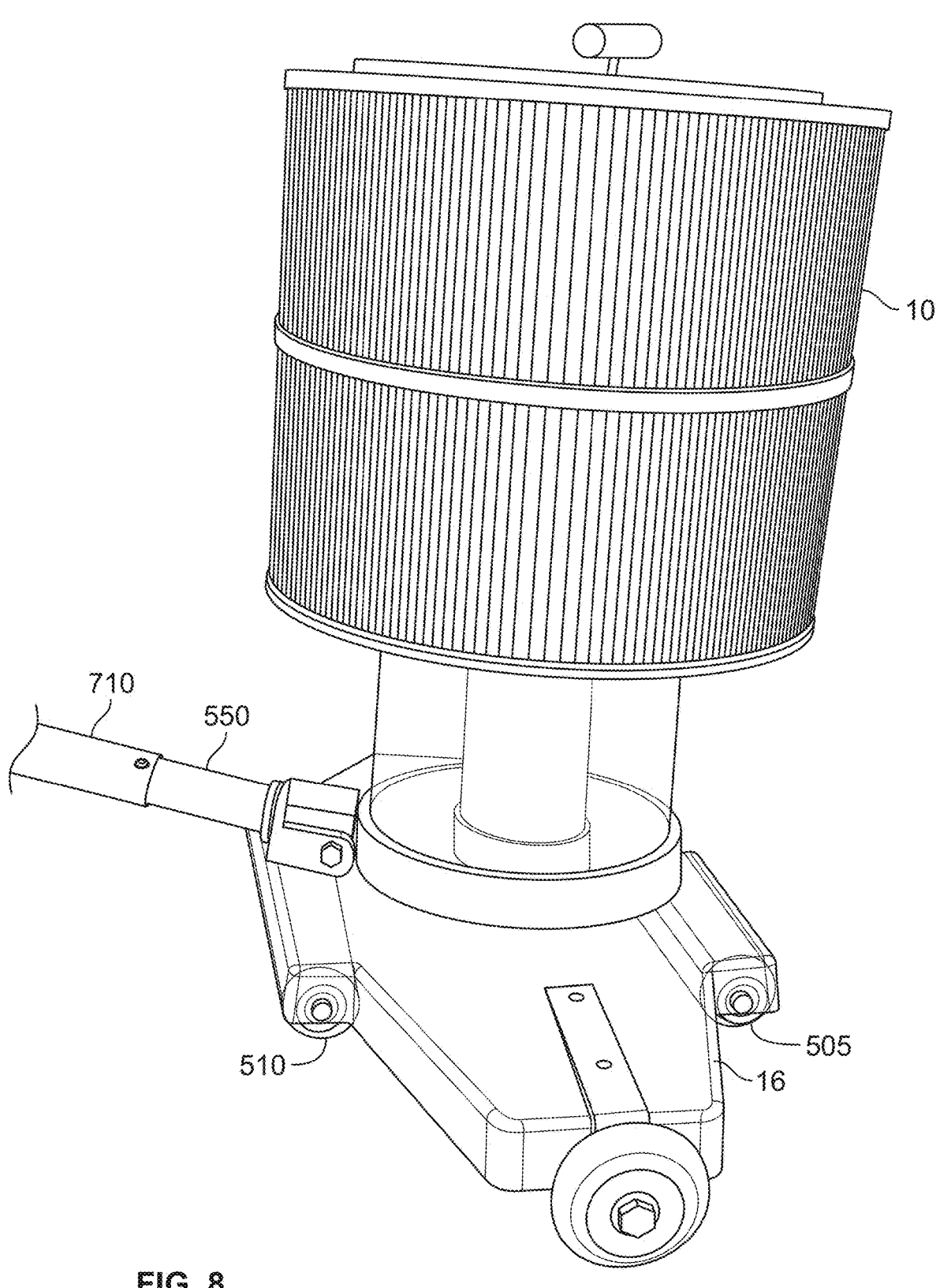
FIG. 8 shows an embodiment of the submersible cleaner when being pulled backward.

FIG. 8 shows an embodiment of the submersible cleaner when being pulled backward. As the user pulls the handle 710, towards the user, the friction of water against the filter 10 causes the submersible cleaner 16 to tilt forwards, allowing the front roller 505 to make contact with the bottom surface of the body of water whereas the back roller 510 is not making contact, allowing for a larger opening between the bottom of the submersible cleaner and the bottom surface to receive debris.

Figure 9:
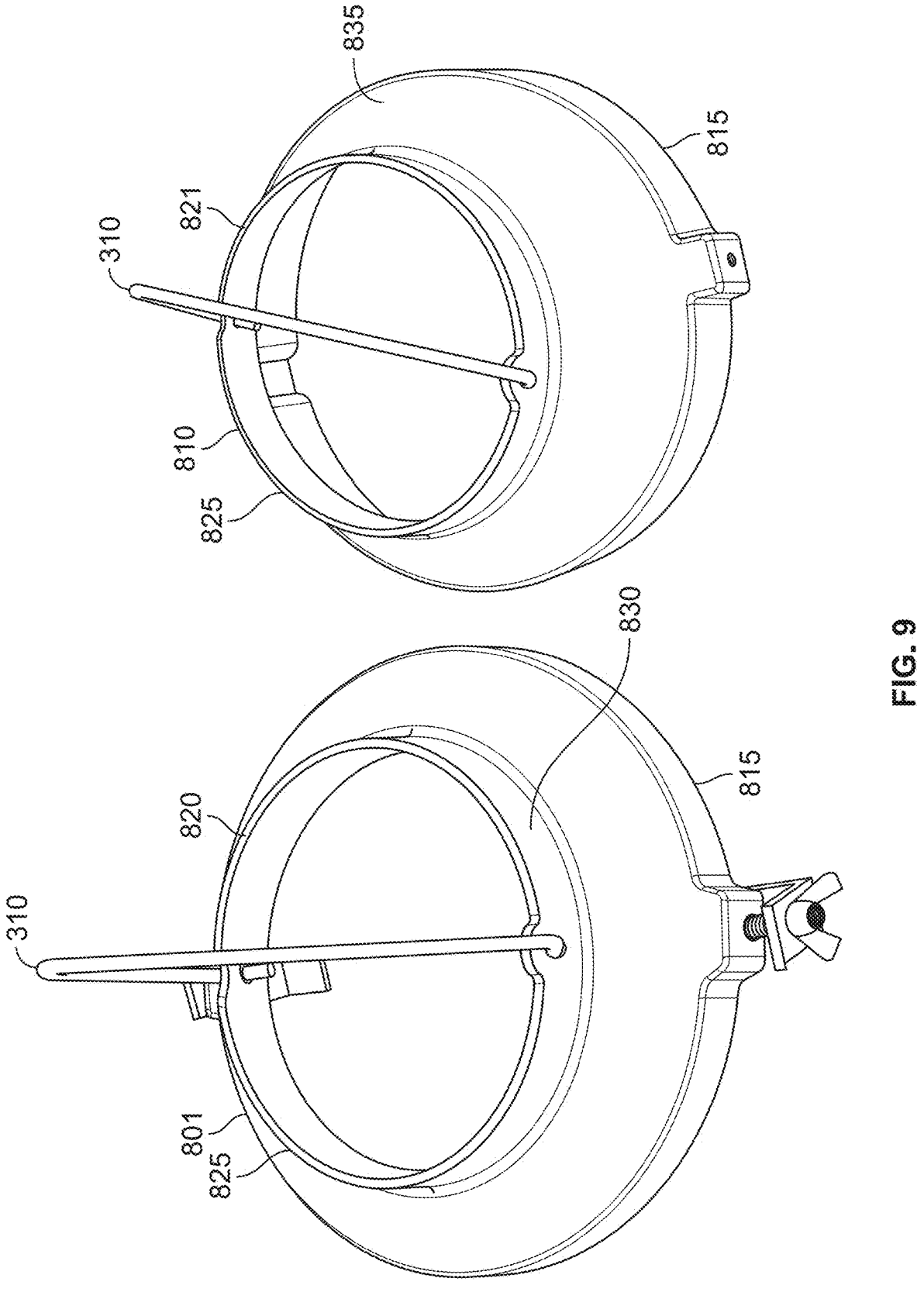
FIG. 9 shows embodiments of an adapter.

FIG. 9 shows embodiments of an adapter. If another type of submersible cleaner 16 is utilized with the filter 10, the rim 320 may be of a greater or lesser diameter than the open-ended filter. In these situations, an adapter may be provided to transition the opening 350 to fit with the diameter of the open-ended filter. The adapter 801, 810 may have a first end 815 with a diameter to fit around the opening 350 of the pool cleaner 16. The adapter 801, 810 may then be shaped or configured to taper to a smaller diameter 820, 821, at a second end 825, to fit within the cylindrical filter 10. In another embodiment, not shown, the adapter 801, 810 may expand to a wider diameter if the filter 10 has a diameter larger than the diameter of the opening 350 of the pool cleaner 16. The tapering of the adapter 801, 810 is not limited. As shown, as non-limiting examples, the tapering may be gradual from the first end 815 to the second end 825, possess a step arrangement 830, may include an arcuate shape 835, etc., when considering the transition from the opening 350 of the pool cleaner 16 to the filter 10. The shape of the adapter may be determined based on the size, shape or dimension of a propeller in the propeller driven system 525 (shown in FIG. 5) of the submersible cleaner 16.

In operation, based on whether the submersible cleaner 16 is pushed or pulled, the handle, by way of the rotatable attachment 550, and arrangement of the contact points 505, 510, 515, 520 allow for tipping of the submersible cleaner based on a direction of movement which assist in creating suction based on the movement of the submersible cleaner 16. This movement provides for a larger opening into which debris may pass and be captured by the submersible cleaner wherein the larger opening is determined by whether the submersible cleaner 16 is being pushed or pulled, as disclosed herein. As a result, the tipping action allows for use of lower power and a smaller propellor as tilting action allows for better vacuum/suction because tilting action. With the propulsion system being located closer to the bottom of the submersible cleaner 16, the submersible cleaner may be used to clean hot tubs and steps that are submerged.

Thus, as disclosed above a system is provided where fastening of all components is done within the open-ended filter. In another embodiment the system is further provided with a submersible cleaner that can provide for a larger area to allow debris to be gathered based on the movement of the submersible cleaner.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A system to secure an open-ended filter to a submersible cleaner, the system comprising:

a yoke, attachable to the submersible cleaner at a first end, that fits within a first opening of the open-ended filter;

a cap for covering a distal end of the open-ended filter; and a rod extending within the open-ended filter from the first end of the yoke to the cap to connect the yoke to the cap;

wherein the cap is comprised of a recessed area that extends within the distal end of the open-ended filter and an outer area that abuts a top surface of the open-ended filter.

2. The system according to claim 1, wherein the cap comprises an opening through which the rod extends.

3. The system according to claim 1, further comprising a securing device attached to an end of the rod at an outside surface of the cap to secure cap and yoke to the rod.

4. The system according to claim 3, further comprising a handle attachable to the end of the rod outside of the cap.

5. The system according to claim 1, wherein the rod comprises a hook arrangement to engage the yoke.

6. The system according to claim 1 wherein the yoke comprises an inverted V arrangement to receive the rod.

7. The system according to claim 6, wherein the rod connects to the yoke at an apex of the V arrangement to align and secure the open-ended filter and cap to the submersible cleaner.

8. The system according to claim 1, wherein the submersible cleaner comprises a rotatable attachment to receive a handle to allow the handle to pivot about an axis holding the rotatable attachment to the submersible cleaner.

9. The system according to claim 1, wherein the submersible cleaner comprises a front roller and a back roller to allow the submersible cleaner to elevate in a front end as the submersible cleaner is pushed forward and a back roller to allow the submersible cleaner to elevate in a back end as the submersible cleaner is pulled backward.

10. The system according to claim 9, wherein the submersible cleaner comprises a left wheel and a right wheel wherein the left wheel and right wheel comprise a larger diameter than the front roller and the back roller.

11. The system according to claim 1, further comprising an adapter to transition an opening of the submersible cleaner to fit with a diameter of the open-ended filter.

12. A system for cleaning the bottom surface within a body of water, the system comprising:

a submersible cleaner with four contacts to the bottom surface of the body of water, wherein a front contact and a back contact comprise a lesser diameter than a right contact and left contact and having a pivotable attachment to attach a handle;

a yoke attached to the submersible cleaner that fits within a first opening of an open ended filter;

a cap for covering a distal end of the open-ended filter; and a rod extending within the open-ended filter from the yoke to the cap to connect the yoke to the cap.

13. The system according to claim 12, wherein the cap is comprised of a recessed area that extends within the distal end of the open-ended filter and an outer area that abuts a top surface of the open-ended filter.

14. The system according to claim 12, wherein the cap comprises an opening through which the rod extends.

15. The system according to claim 12, further comprising a securing device attached to an end of the rod at an outside surface of the cap to secure the cap and the yoke to the rod.

16. The system according to claim 12, further comprising a handle attachable to the end of the rod outside of the cap and the rod having a hook arrangement to engage the yoke.

17. The system according to claim 12, wherein the pivotal attachment is configured to allow the handle to pivot about an axis holding the pivotal attachment to the submersible cleaner.

18. The system according to claim 12, wherein the front contact allows the submersible cleaner to elevate a front side as the submersible cleaner is pushed forward and the back contact to allow the submersible cleaner to elevate in a back side as the submersible cleaner is pulled backward.

19. The system according to claim 12, further comprising an adapter to transition an opening of the submersible cleaner to fit with a diameter of the open-ended filter.

20. A system to secure an open-ended filter to a submersible cleaner, the system comprising:

a yoke, attachable to the submersible cleaner at a first end, that fits within a first opening of the open-ended filter;

a cap for covering a distal end of the open-ended filter; and a rod extending within the open-ended filter from the first end of the yoke to the cap to connect the yoke to the cap;

a securing device attached to an end of the rod at an outside surface of the cap to secure cap and yoke to the rod; and a handle attachable to the end of the rod outside of the cap.

* * * * *